United States Patent [19]

Ohmstede

[11] Patent Number: 4,547,963
[45] Date of Patent: Oct. 22, 1985

[54] APPARATUS AND METHOD FOR INSERTING TUBES INTO A HEAT EXCHANGER FRAME

[75] Inventor: Robert L. Ohmstede, Beaumont, Tex.

[73] Assignee: Ohmstede Machine Works, Inc., Beaumont, Tex.

[21] Appl. No.: 504,421

[22] Filed: Jun. 15, 1983

[51] Int. Cl.⁴ .............................................. B23P 15/26
[52] U.S. Cl. ........................................ 29/726; 414/746
[58] Field of Search ................... 29/727, 726, 157.3 A, 29/157.3 B, 157.3 C, 157.4; 414/746, 745

[56] References Cited

U.S. PATENT DOCUMENTS

| | | | |
|---|---|---|---|
| 3,482,298 | 12/1969 | Brucken | 29/157.3 B |
| 3,574,917 | 4/1971 | Miyazaki | 29/202 |
| 3,789,479 | 2/1974 | Zifferer et al. | 29/157.3 B |
| 3,867,752 | 2/1975 | Tachibana et al. | 29/726 |
| 3,935,951 | 2/1976 | Claus et al. | 29/726 |
| 3,954,187 | 5/1976 | Van Der Woerd | 414/746 |
| 4,104,790 | 8/1978 | Hindrichs | 29/707 |
| 4,125,928 | 11/1978 | Cawley et al. | 29/427 |
| 4,221,534 | 9/1980 | Rethy | 29/726 |

Primary Examiner—Howard N. Goldberg
Assistant Examiner—Vernon K. Rising
Attorney, Agent, or Firm—Cushman, Darby & Cushman

[57] ABSTRACT

The heat exchanger frame is mounted on arcuate cradles on longitudinal rails so it may be angularly rotated and longitudinally moved, and locked in position. Each baffle is supported, and by preference the tube sheets are vertically adjustably supported. Adjacent one end of the heat exchanger frame a vertical way system is provided. On it a generally horizontal tube rack, is vertically adjustably mounted, as are a horizontally laterally movable way system and a worker-support platform. On the horizontal way system is provided at least one feed roll head. The feed roll head preferably has an automatically adjustable nip, is vertically counterbalanced for slight vertical self-adjustment, is reversible and incorporates a pusher piston for automatically pushing the trailing end of a tube being inserted the last couple of inches so as to clear the feed roll head.

10 Claims, 14 Drawing Figures

APPARATUS AND METHOD FOR INSERTING TUBES INTO A HEAT EXCHANGER FRAME

BACKGROUND OF THE INVENTION

The frame 10 of an industrial shell and tube-type of heat exchanger typically mainly comprises two transversally oriented opposite end tube sheets 12, 14 and a plurality of intervening transversally oriented baffles 16 spaced in a series along the longitudinal distance between the opposite end tube sheets. In a heat exchanger where the frame is about twenty or thirty feet long typically may have fifteen or more baffles. Each baffle typically has a missing perimetrical segment or other main opening 18. Adjacent baffles have regularly related but non-coincident relative angular orientations, e.g. with adjacent baffles having their missing sectors or other main openings diametrically opposed.

The transverse elements 12, 14, 16 have a set of correspondingly located openings, e.g. except where a baffle is missing a corresponding segment. A respective tie bar 20 is projected axially through each series of correspondingly axially aligned tube sheet openings 22 and baffle openings 24, being slipped through appropriate-length spacers 26 in between each two adjoining baffles or tube sheet and baffle.

Generally a plurality of these longitudinal rods are provided with regular angular spacing near the outer peripheral margin of the tube sheets and baffles.

At one end, each tie bar is tightened against the outer face of the respective tube sheet using a fastener 28 and at the other end, each tie bar is tightened against the last baffle using a fastener 28, to create a generally structured framework for supporting the tubes of the tube bundle of the heat exchanger.

To that end, the tube sheets and baffles, further to the openings provided for receiving the respective tie rods, typically have a great plurality of openings 30 arranged in like regular grid patterns. For each hole 30 through one tube sheet, either there is an axially aligned hole 30 through each succeeding baffle, or that hole is coincident with a missing sector or other main opening 18 through that baffle, and there is an axially aligned hole 30 through the opposite tube sheet.

In large industrial shell and tube type heat exchangers, each tube sheet may have several thousand holes 30 through it, all arranged in a regular grid pattern.

In tubing a heat exchanger frame, it is necessary to longitudinally telescopically insert each tube into the frame through a corresponding series of axially aligned holes, starting through one tube sheet. Heretofore as known to the inventor, this job has been one which took two or more workers a great deal of time.

The present invention has to do with apparatus and a method for inserting the tubes into a heat exchanger frame with increased efficiency and productivity.

SUMMARY OF THE INVENTION

The heat exchanger frame is mounted on arcuate cradles on longitudinal rails so it may be angularly rotated and longitudinally moved, and locked in position. Each baffle is supported, and by preference the tube sheets are vertically adjustably supported. Adjacent one end of the heat exchanger frame a vertical way system is provided. On it a generally horizontal tube rack is vertically adjustably mounted, as are a horizontally laterally movable way system and a worker-support platform. On the horizontal way system is provided at least one feed roll head. The feed roll head preferably has an automatically adjustable nip, is vertically counterbalanced for slight vertical self-adjustment, is reversible and incorporates a pusher piston for automatically pushing the trailing end of a tube being inserted the last couple of inches so as to clear the feed roll head.

The principles of the invention will be further discussed with reference to the drawings wherein a preferred embodiment is shown. The specifics illustrated in the drawings are intended to exemplify, rather than limit, aspects of the invention as defined in the claims.

DETAILED DESCRIPTION

The typical heat exchanger frame 10 has already been described hereinabove together with its elements 12–30, in the Background section.

Figures 1, 2:
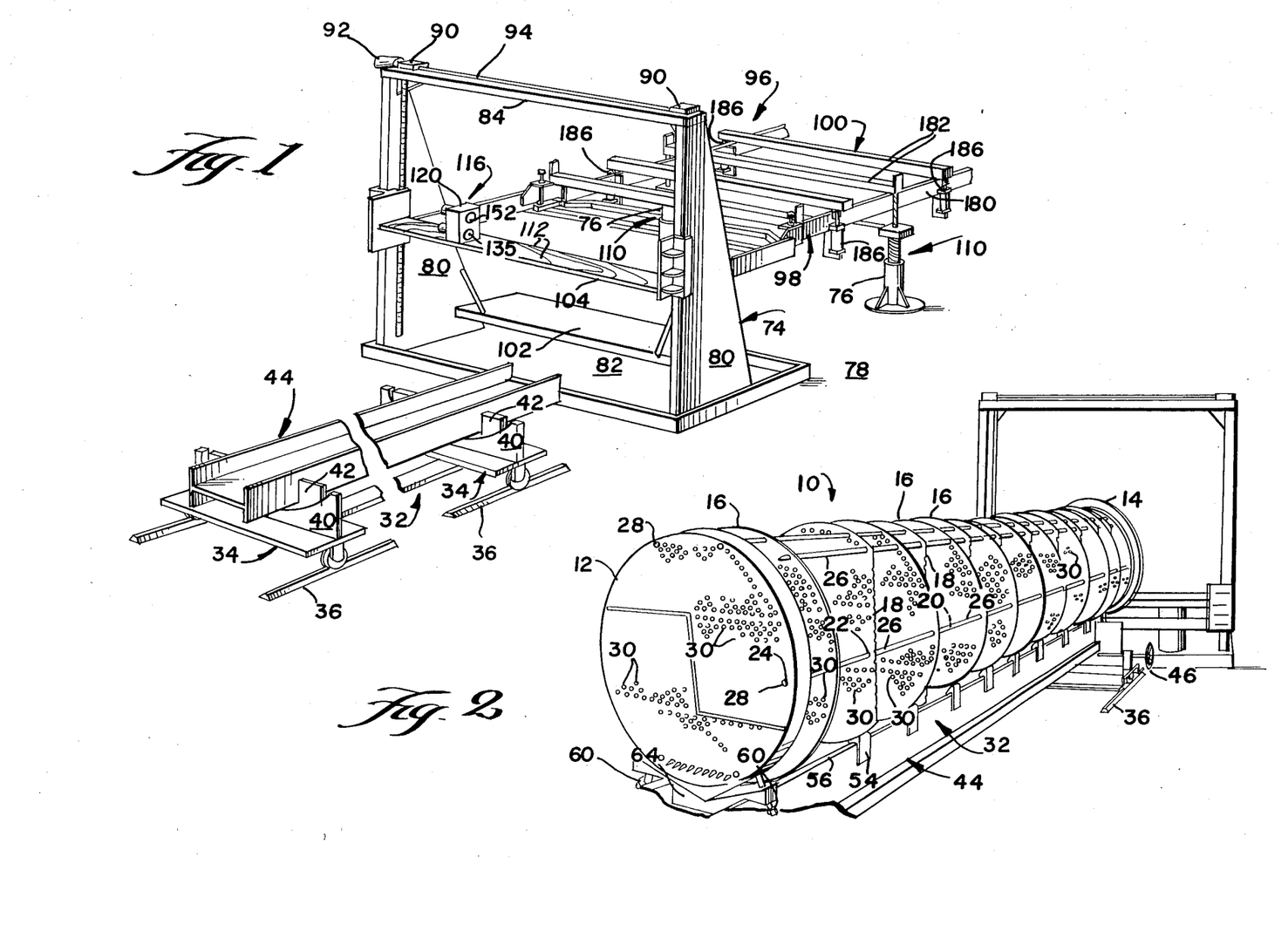
FIG. 1 is a perspective view of an embodiment of apparatus of the invention, looking from the cradle where the heat exchanger frame will be located, past the vertical and horizontal way systems at the tube rack portion of the vertical way system. Neither the heat exchanger frame nor any tubes are shown in this view.
FIG. 2 is a perspective view of a heat exchanger frame resting in the cradle.

To begin a tube insertion operation on a heat exchanger frame, the heat exchanger frame 10 is supportingly placed upon the cradle 32. In some instances, the heat exchanger frame is assembled upon the cradle 32; in other instances the heat exchanger frame may be assembled elsewhere and deposited as a unit upon the cradle 32.

Figure 4:
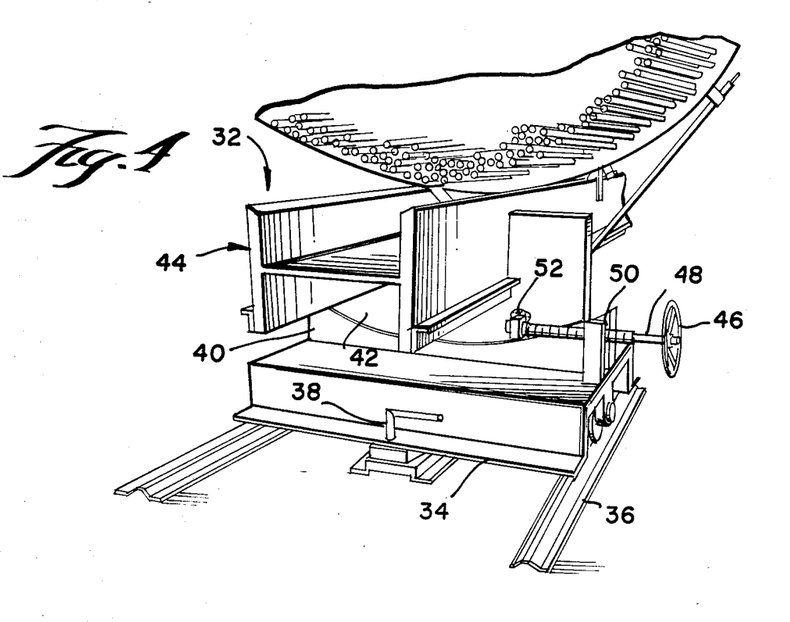
FIG. 4 is a fragmentary perspective view showing how the cradle is prevented from moving longitudinally along the rails once it has been brought to the desired longitudinal position.

The cradle 32 is seen to include a base 34 which is longitudinally adustably supported on guide rails 36. In order to longitudinally adjust the position of the cradle 32, the base 34 is pushed or pulled along the rails 36 and then the locking device 38 is activated to prevent undesired longitudinal movement of the cradle out of adjustment.

Figure 6:
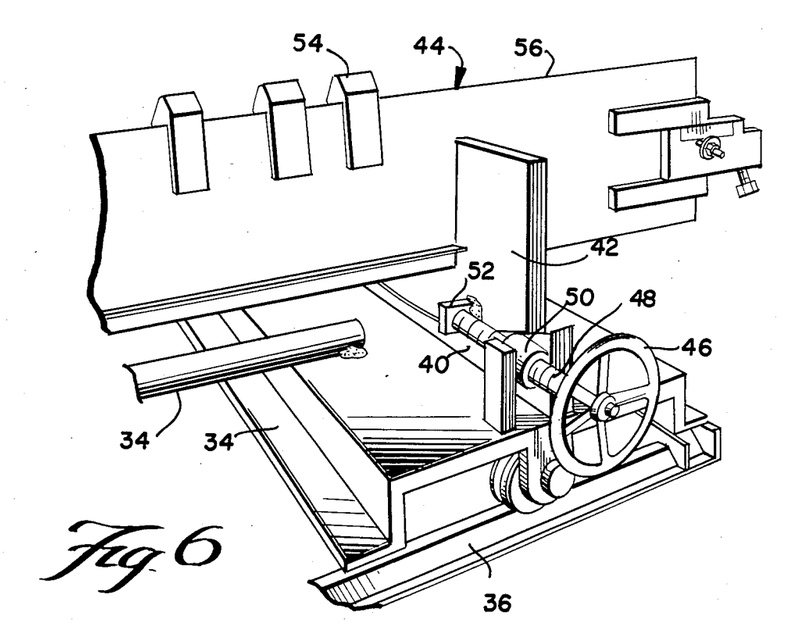
FIG. 6 is a fragmentary perspective view showing how a handwheel system preferably is provided between the angularly rotatable portion of the cradle and its base, so that fine adjustments may be made to the angular disposition of the heat exchanger frame on the cradle.

On the cradle base 34 are shown provided two axially spaced circularly curved, upwardly concave trunnions 40 which journal corresponding curved rockers 42. The two rockers are rigidly connected longitudinally of the cradle by a main beam 44. A handwheel 46 is provided on a shaft 48 that is journalled in a bearing 50 that is pivotally mounted on the cradle base. The shaft 48 also is threadedly engaged in a nut 52 which is mounted to one of the cradle rockers. Thus the handwheel 46 may be rotated for slightly adjusting the angular disposition of the angularly movable portion of the cradle and thus of the heat exchanger frame carried thereon.

Figure 3:
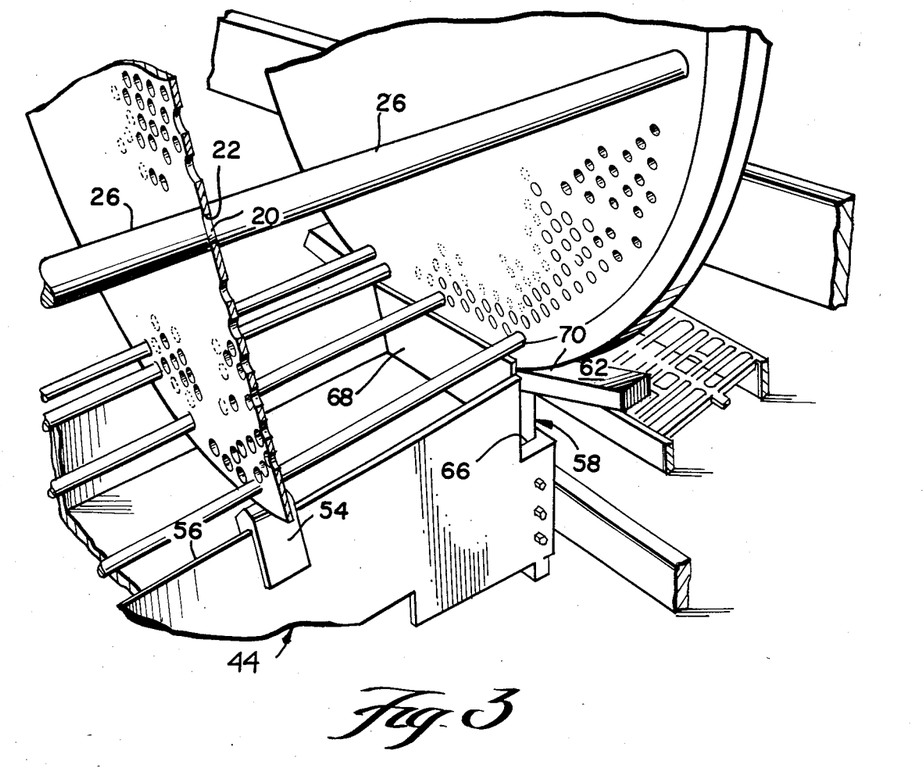
FIG. 3 is a fragmentary perspective view showing how the stationary tube sheet is vertically-adjustably supported on the cradle and the heat exchanger frame is prevented from being pushed axially along the cradle as tubes are longitudinally inserted.
Figure 5:
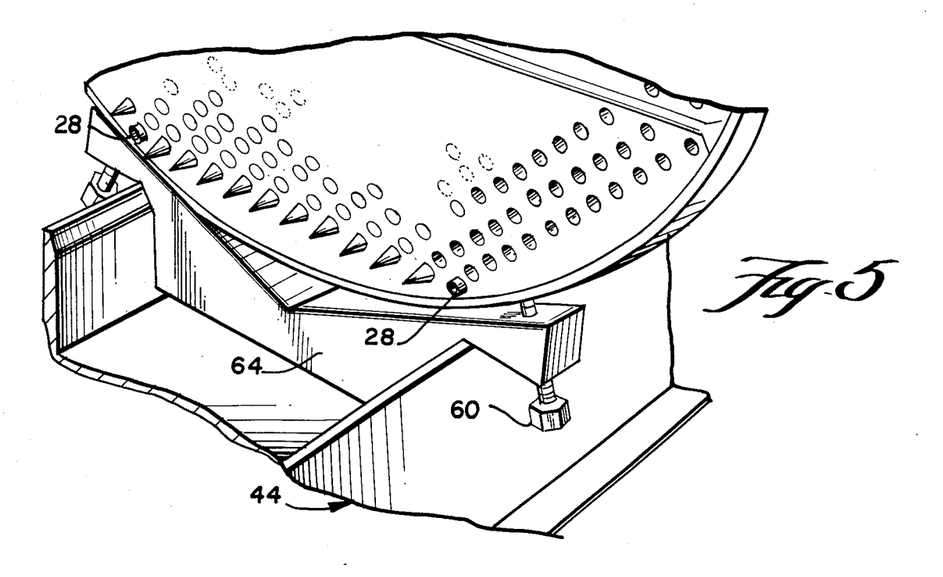
FIG. 5 is a fragmentary perspective view showing how the floating tube sheet is vertically-adjustably supported on the cradle.

As shown, a plurality of shims 54 may be provided on the two upstanding edges 56 of the flanges of the main beam 44 to support all of the baffles at corresponding levels so that their corresponding holes 30 are axially aligned. Vertical adjustment means 58, 60 are shown provided for the respective V-shaped centering shims 62, 64 provided on the main beam 44 for supporting the stationary tube sheet and the floating tube sheet, respectively. As shown, whereas the latter support shim 64 merely rests bridge-like upon the flanges of the main beam 44, the shim 62 for supporting the stationary tube sheet is mounted in a vertically opening slot 66 at the head end of the main beam 44. A fixed stop plate 68 is positioned even with the back wall of the slot 66 and projects from between the main beam flanges up to above the V-shaped support surface 70 of the shim 62, so as to backstop the stationary tube sheet and thus prevent the heat exchanger frame from being pushed axially along the cradle as tubes are being inserted.

Disposed in longitudinal alignment with the cradle adjacent the head end of the cradle is the tube inserting device 72.

The tube inserting device is shown including a main base 74 and jack bases 76. The main base 74 typically is an upright rectangular rigid structure with appropriate bracing so that it rests stably on a plant foundation 78. Thus the main base structure includes two laterally spaced uprights 80, a lower crosspiece portion 82 and an upper crosspiece portion 84. Each upright 80 includes guide rails 86, 87 and a lead screw 88 each journalled for reversible rotation about its own vertically oriented longitudinal axis. Gear boxes 90 for the respective screws 86 are shown mounted on the upper crosspiece 84. One gear box 90 is shown surmounted by a hydraulic motor 92 and the two gear boxes are shown drivingly interconnected at 94. Accordingly, as the hydraulic motor 92 is run in one direction, both screws 86 are correspondingly rotated in a first direction, and as the hydraulic motor 92 is run in the opposite direction, both screws 86 are correspondingly rotated in a second direction.

Figure 7:
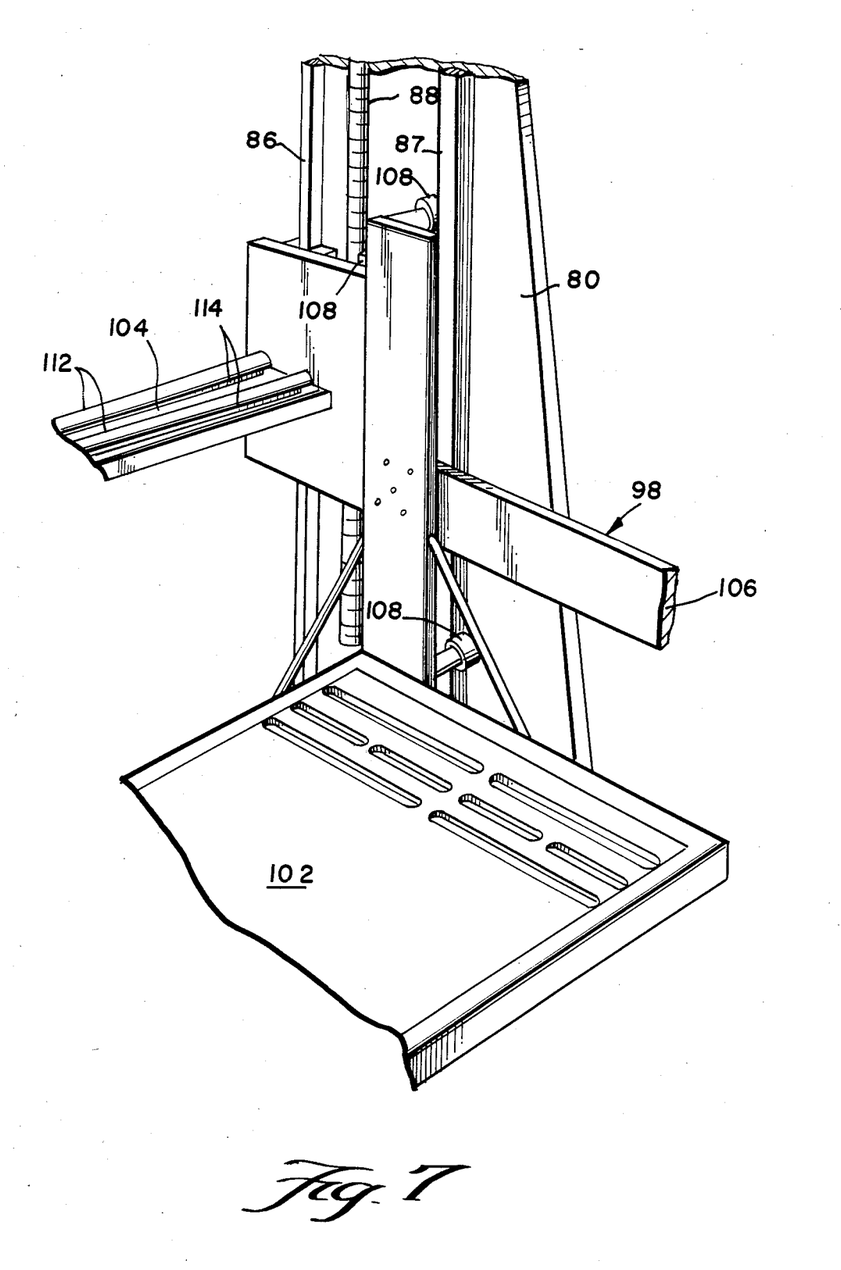
FIG. 7 is a fragmentary perspective view showing how the operator platform, tube rack and base for the horizontal way system are mounted for vertical movement as a unit.

The platform assembly 96 of the tube inserting device 72 includes a frame 98 which unites a tube rack 100 with a worker support platform 102 and a roll feed head support platform 104. Side plates 106 of the frame 98 of the platform assembly 96 mount lifting dogs 108 which are threadedly engaged with the respective lead screws 86. The side plates 106 are shown having a rail and groove-type guided relationship with the uprights 80 of the main base at 86, and an opposed roller bearing-type guided relationship therewith at 108, 87. Accordingly, as the motor 92 is operated in one direction, the platform assembly 96 is elevated with the tube rack 100, worker support platform 102 and roll feed head platform going up correspondingly.

The far end of the tube rack is shown supported by hydraulic jacks 110 driven by a hydraulic motor 92A. The motor 92A may be controlled jointly with the motor 92 by using a flow divider in a common hydraulic system so that the tube rack 100 moves essentially vertically while remaining substantially horizontal. Further, the motor 92A may be operated independently in order to finely adjust the height of the tube rack 100.

Operation of the motor 92 and hydraulic jacks 110 in the opposite direction correspondingly lowers the platform assembly 96.

Figure 8:
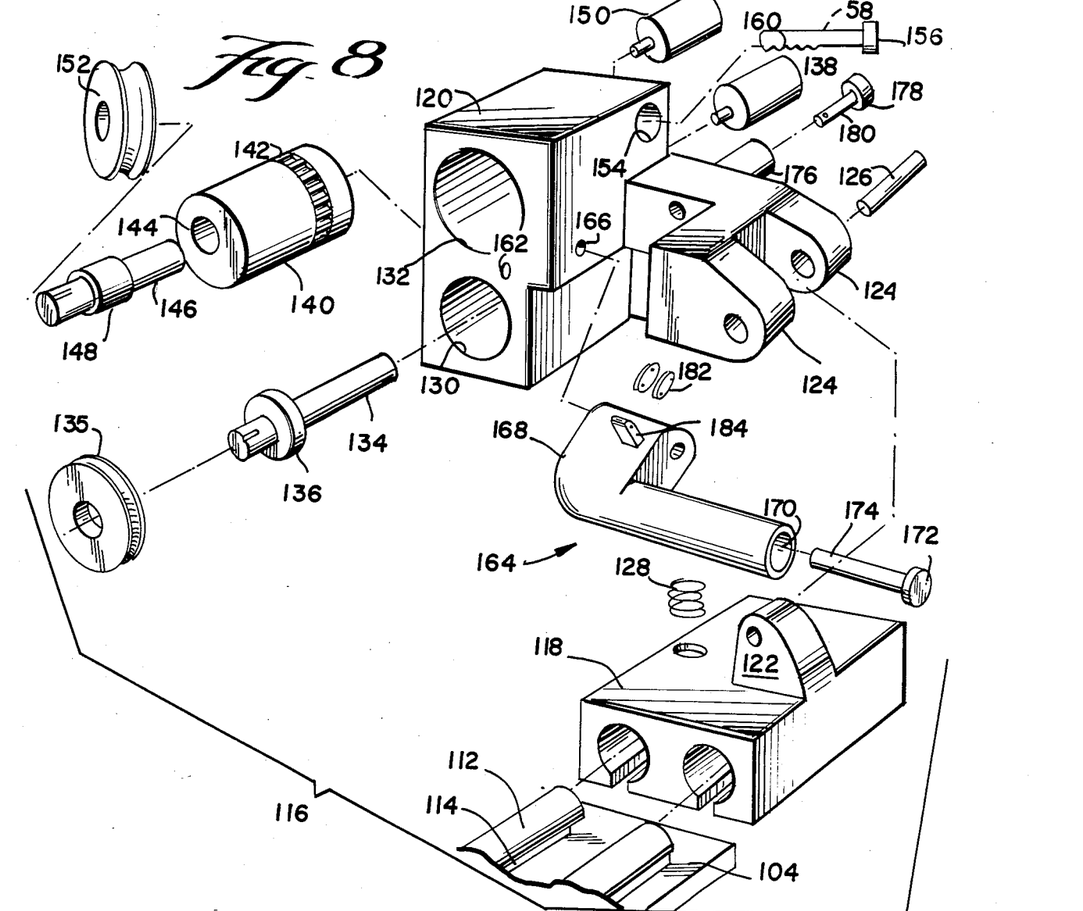
FIG. 8 is an exploded perspective view of the base of the horizontal way system and a feed roll head.

The roll feed support platform is shown fixedly supporting a pair of longitudinally spaced, horizontal, transversally extending cylindrically sectional rails 112 mounted on respective short vertical webs 114.

In FIG. 8, the feed roll head 116 (which may be one of two or more identical units), is shown including a ball bushing bearing housing 118 having two corresponding bushing slots by which the housing 118 is freely slidably mounted on the rails 112.

The feed roll head 116 further includes a main housing 120. The bearing housing 118 and the main housing 120 are shown provided with respective interdigitable pintle knuckles 122, 124. When these are interdigitated, a pivot pin 126 may be installed through them so as to cause the main housing 120 to be pivotally mounted upon the bearing housing 118 about a horizontal, transversally extending axis. Preferably the pivotal connection 122-126 is located toward one end of the feed roll head, and a compression coil spring 128 is mounted between the housings 118 and 120 toward the opposite end of the feed roll head. The force constant of the spring 128 is sufficient that the spring 128 supports most of the weight of the main housing 120. Accordingly, the main housing may move up and down slightly about the axis of the pivot pin 126 by increasing and decreasing the degree of compression of the counterbalancing spring 128.

The main housing has two vertically adjoining, horizontally transversally oriented cylindrical sockets 130, 132 formed therein. The lower one 130 mounts a lower shaft 134 and its bearings 136. At the laterally outer side of the main housing a hydraulic motor 138 is drivingly connected to the lower shaft 134. At the laterally inner side of the main housing, a lower driving roll 135 is secured on the lower shaft 134. The upper socket 132 mounts an eccentric bearing housing 140 having a band of gear teeth 142 provided angularly of its exterior. In the eccentrically located socket 144 provided in the housing 140, an upper shaft 146 and its bearings 148 are journalled. At the laterally outer side of the main housing, a hydraulic motor 150 is drivingly connected to the upper shaft 146. At the laterally inner side of the main housing, an upper driving roll 152 is secured on the upper shaft 146.

The upper and lower drive rolls have respective radially outer peripheral surfaces of substantially semicircular cross-sectional profile, and are polished so that the two surfaces may drivingly engage between them a major portion, as much as substantially all of the surface of a tube being fed in the nip thereof without scuffing the surface of the tube.

The main housing 120 is seen to further include a longitudinally oriented horizontal socket 154 which intersects the upper socket 132. In the socket 154 there is mounted an hydraulic piston 156 having a piston rod 158 formed with a series of rack gear teeth 160 which are disposed in meshing relation with the gear 142 formed on the eccentric bearing housing 140. Accordingly, as the piston 156 is hydraulically driven in and out in the socket 154, the eccentric housing 140 is correspondingly reversingly angularly moved. The effect is to controllably open and close the nip of the peripherally confronting driving rolls 135 and 152.

A control system for the feed roll head 116 includes a proximity switch 162 shown mounted on the inner side of the main housing 120 just upstream of the nip of the rolls 135, 152. Accordingly a tube being fed contacts the switch 162 as the lead end of the tube is about to enter the feed roll nip and leaves contact with the switch 162 as the trailing end of the tube is about to enter the feed roll nip. The proximity switch 162 is operatively connected in controlling relation to the hydraulic system serving the piston 156, so that as the leading end of a tube is fed to the feed roll nip, the piston 156 is moved in a sense to lower the upper drive roll so that the tube is drivingly engaged between the two feed rolls. Then, as the trailing end of the tube clears the switch 162, the piston 156 is moved in a sense to raise the upper drive roll, thus opening the drive roll nip.

By preference, the feed roll head 116 further includes a pusher piston assembly 164 pivotally mounted at 166 on the laterally inner side of the main housing 120. The pusher piston assembly includes a housing 168 having a horizontal, longitudinally aligned socket 170 in which is slidingly mounted a hydraulic piston 172 having a push rod 174 which is arranged to be projected longitudinally downstream from the socket 170. Accordingly, the rod 174 may be retracted and projected by application of hydraulic control pressure to the piston 172.

The drive roll head 116 main housing 120 further mounts a cylinder 176 having a hydraulic piston 178 slidingly received therein. The rod 180 of the piston 178 is pivotally pinned at 182 to a crank link 184 projected laterally from the housing 168. Accordingly, by applying hydraulic control pressure to the piston 178, the housing 168 can be pivotally moved between a storage location, where its push rod 174 is out of the way, and a use position in which the push rod 174 is axially aligned with the nip of the drive roll head 116. By preference, the proximity switch 162 is connected in controlling relation to the piston 178 and to the piston 172. Accordingly, as the tube being inserted clears the proximity switch 162 and the nip opens up, the piston 178 is operated to temporarily swing the pusher piston assembly 164 into its position of use, whereupon the piston 176 momentarily is thrust in a sense to cause the push rod 174 to push the tube a couple of inches or so, thus getting the tube clear of the drive roll head 116 and to push the tube flush with the face of the tube sheet. Where the tubes are easily manually advanced the last couple of inches, the pusher piston assembly may simply be turned off and remain in its storage position.

Accordingly, as tubes are about to be installed in a heat exchanger frame, the heat exchanger frame is first positioned and leveled on the cradle as indicated hereinabove.

The operator raises the platform assembly until the nip of the feed rolls is centered at the level of the center lines of a row of holes 30 in the stationary tube sheet 12.

A plurality of tubes is loaded onto the tube rack 100. The near and far laterally opposite ends of the tube rack are provided with vertically upwardly projecting short fence structures for preventing tubes from rolling off the rack while awaiting use. Where it is more convenient to load the rack 100 with tubes from one side than the other, in order to spread a layer of tubes across the width of the tube rack 100, it may be provided as a lower structure 180 which is directly fixed to the platform assembly, and an upper structure 182 which directly supports the tubes. The structure 182 is pivotally mounted to the structure 180 at 184 along one side and mounted thereto via short thrust hydraulic piston and cylinder assemblies 186 along the opposite side thereof. Accordingly, as the worker is loading tubes onto the tube rack 100, the piston and cylinder assemblies 186 may be extended slightly so as to tilt the tube rack 100 slightly away from the worker. Accordingly, tubes placed on the side of the rack that is most accessible to the worker roll towards the opposite side until the worker has loaded a whole layer of tubes onto the tube rack 100. Then the piston and cylinder assemblies 186 may be retracted to level the tube rack.

Figure 9:
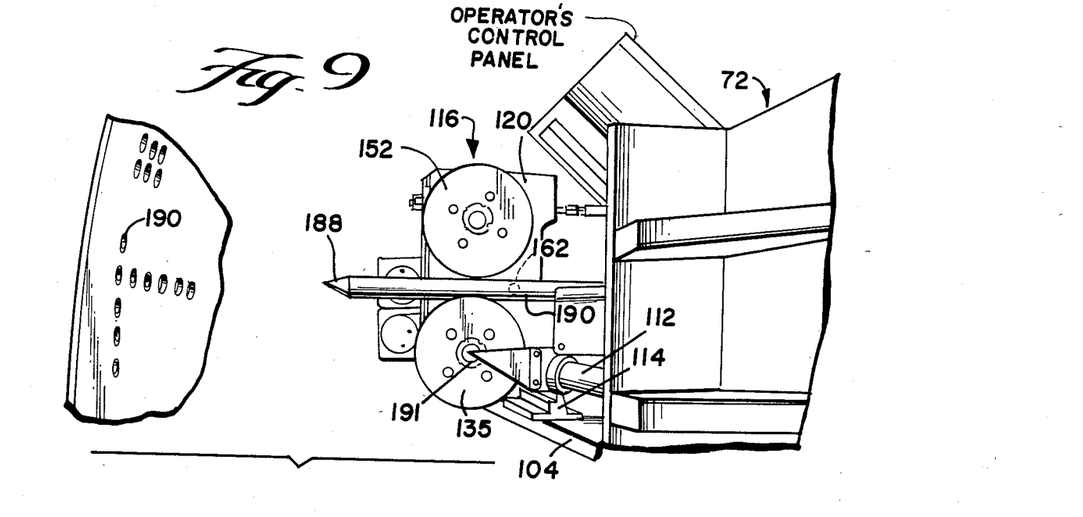
FIG. 9 is a fragmentary perspective view showing a tube beginning to be fed by the feed roll head.

The level of the layer, or uppermost layer of tubes on the tube rack is approximately the same level as the nip of the feed rolls. When the nip of the feed rolls has been brought to alignment with a hole 30 in the stationary tube sheet, a conventional guide 188 is inserted in the leading end of a tube 190, and the tube, with the guide 188 as a bluntly-pointed protrusion is fed to the nip of the feed roll head 116.

When the worker inserts the first tube in a particular row, a glance at the pointer 191 by coinciding with the axis of the drive wheel will advise the worker that the head 116 is at the center of independent vertical movement and therefore the platform assembly does not need to be adjusted up or down for inserting the tubes in the corresponding row.

Figure 10:
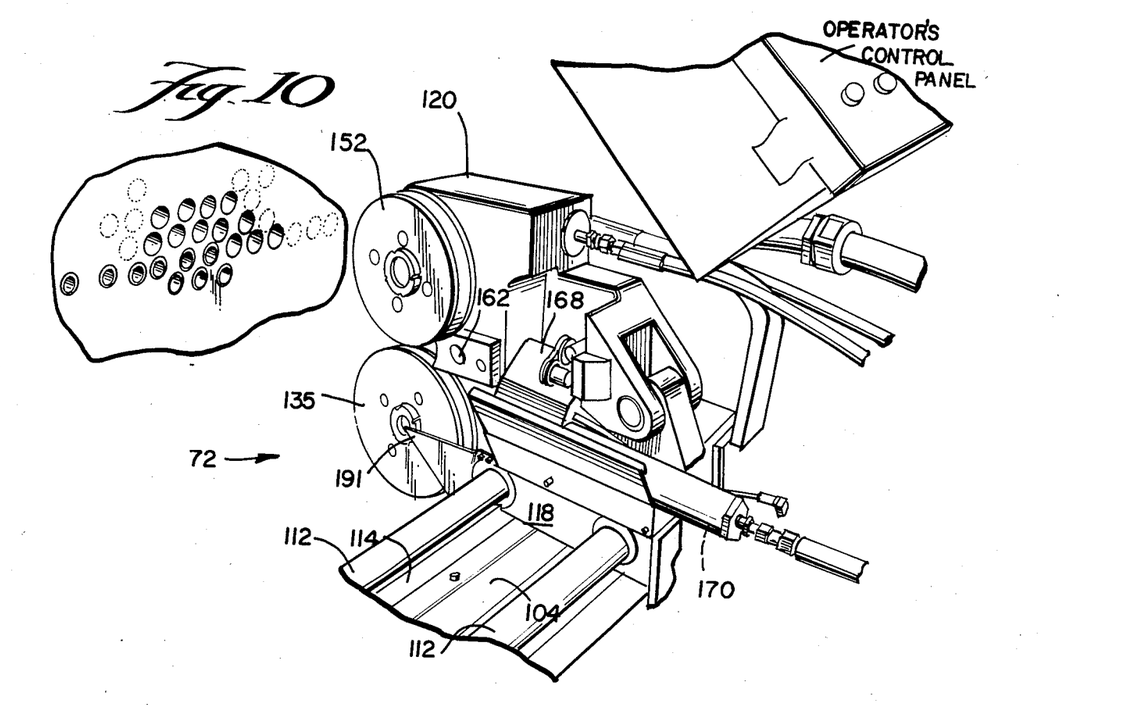
FIG. 10 is a perspective view from the operators control platform, beside the control box, after the conclusion of installation of a tube by the feed roll head.
Figure 11:
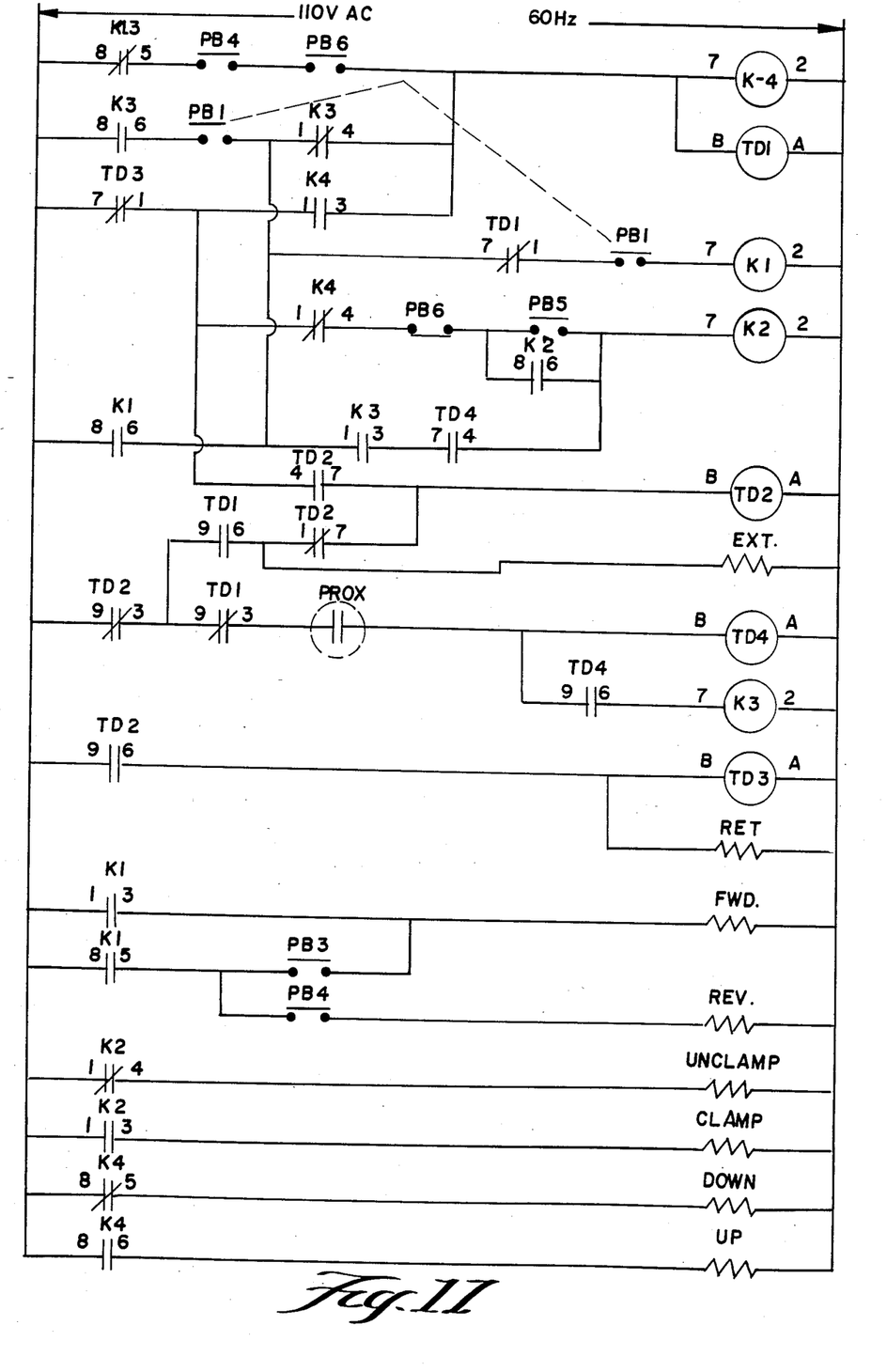
FIGS. 11–14 are typical schematic diagrams of the electrical and hydraulic circuits and controls of the apparatus of the invention.
Figure 12:
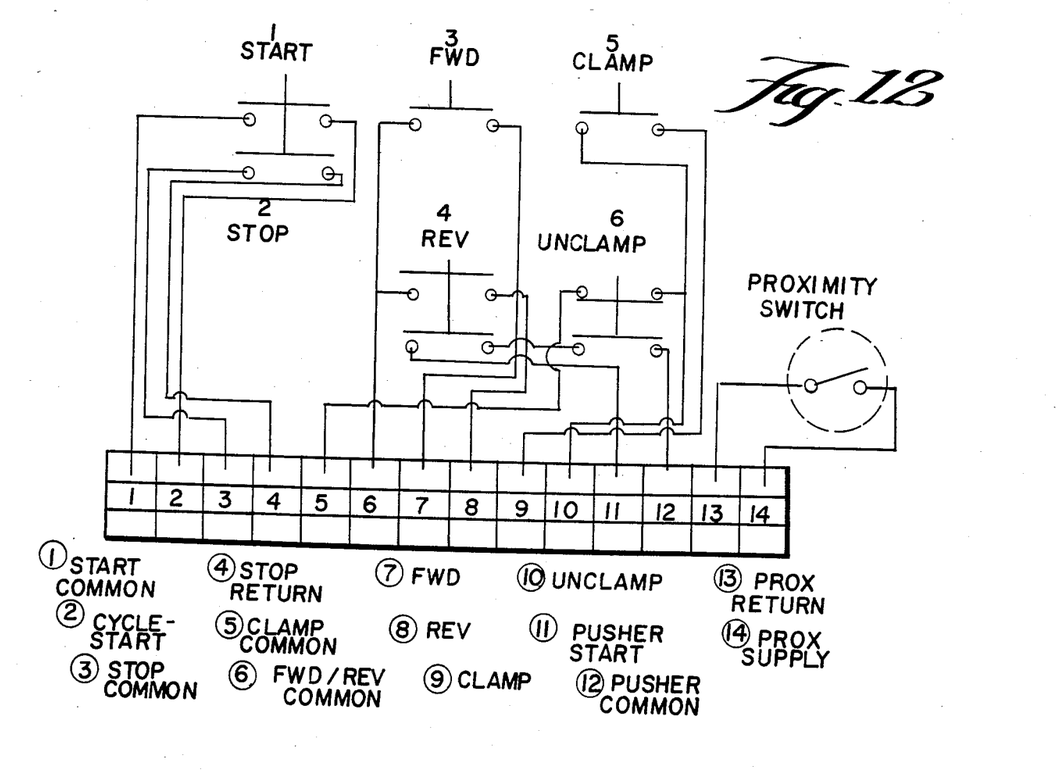
Figure 13:
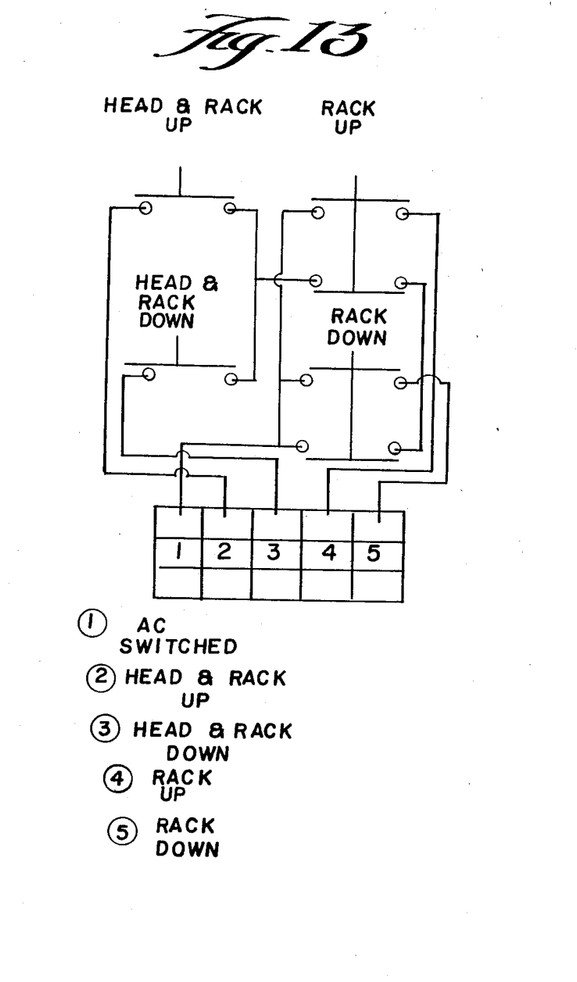
Figure 14:
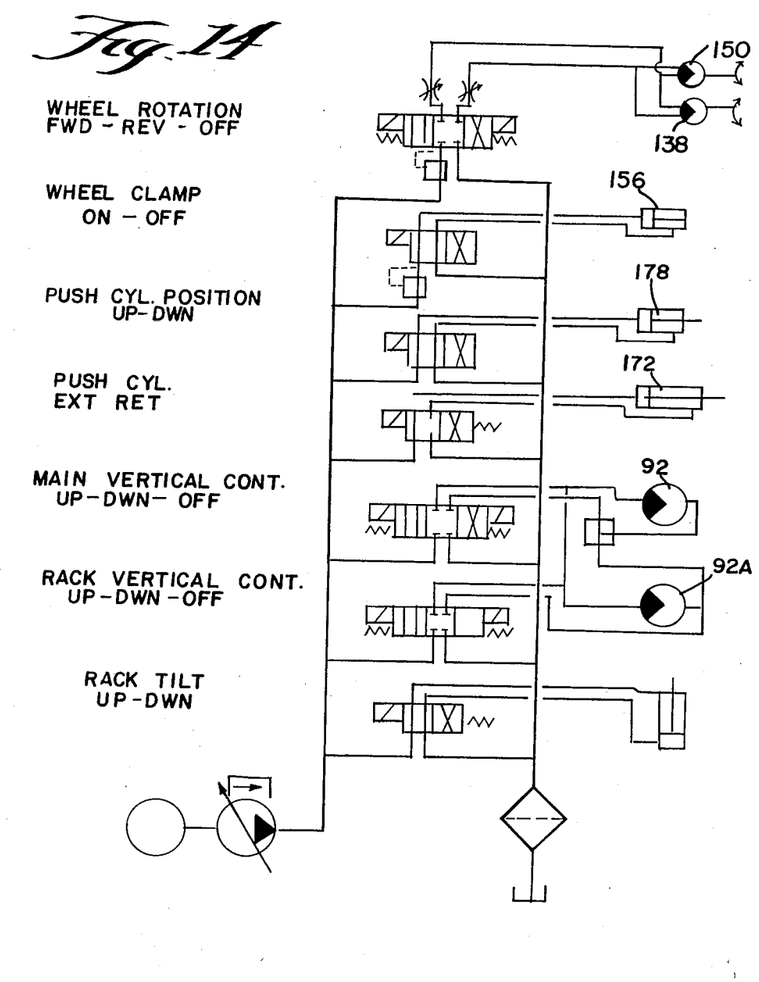

The operator advances the tube 190 until the guide 188 enters the respective hole 30 in the stationary tube sheet. The proximity switch 162 senses the presence of the tube 190 and closes the nip so that the upper and lower feed rolls drive the tube longitudinally into the heat exchanger frame through the respective set of holes 30. When the trailing end of the tube 190 passes the proximity switch, the switch sensing the absence of a tube opens the feed roll nip. The pusher piston assembly 164 is pivoted into position and the push rod 174 is thrust to push the tube 190 a couple inches further into the heat exchanger frame and out of the way of the feed roll head 116. The pusher piston assembly 164 then pivots back out of the way. The worker after repeating this procedure for each hole 30 in a common row on the stationary tube sheet elevates the platform assembly to bring the nip of the feed roll head 116 level with the next higher row so that the procedure may be repeated for each series of holes 30 at that level.

The provision of a worker platform which rises with the level of the row being worked on ensures that the worker will be able to maintain the same comfortable spatial relation to the work.

It should now be apparent that the apparatus and method for inserting tubes into a heat exchanger frame as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. For inserting tubes in a heat exchanger frame which includes two opposite tube sheets, a plurality of transverse baffles arranged in a series extending longitudinally between the tube sheets, and securement means extending longitudinally between the tube sheets at a plurality of peripheral sites and maintaining longitudinal spacing of said tube sheets and baffles, where the tube sheets and baffles each have a like arrangement of holes formed therethrough comprising a plurality of rows of holes, and rows being at correspondingly different levels, each such hole in a tube sheet and baffle being a member of a respective set of corresponding substantially coaxially aligned holes in others of said tube sheets and baffles, apparatus, comprising:

(a) means for supporting the heat exchanger frame on a foundation so that corresponding rows of holes through each tube sheet and said baffles are substantially horizontal and at the same level, the means for supporting the heat exchanger frame including:

rail means fixed on a foundation;

a base mounted for guided movement along said rail means;

the base including upwardly concavely arcuate circularly curved trunnion means;

complementarily curved rocker means journalled for rotation on said trunnion means; and a support bed mounted on said rocker means, said support bed being constructed and arranged to bear said heat exchanger frame thereon;

(b) means for locking the heat exchanger frame relative to said support means and relative to the foundation so that the frame will not be substantially longitudinally displaced as tubes are longitudinally inserted therein through one said tube sheet thereof;

(c) a platform assembly;

(d) said platform assembly includes a substantially horizontal transversally extending rail means;

(e) a motorized tube feeder mounted on said rail means for transverse movement along said rail means, said motorized tube feeder having means defining a nip aimed to face said one tube sheet when said heat exchanger frame is supported on said support means; and (f) means for vertically adjustably moving and disposing said platform assembly so that the nip of said motorized tube feeder may be brought to the level of a row, whereupon said motorized feeder may be moved transversally along said rail means for centering the nip on an individual said set of holes so that a tube may be fed through said motorized feeder into said set of holes.

2. The apparatus of claim 1, wherein:

the platform assembly further includes a generally horizontally disposed tube rack juxtaposed with said nip, said tube rack being constructed and arranged to support a plurality of tubes thereon.

3. The apparatus of claim 2, wherein:

the platform assembly further includes a worker support platform disposed below said tube rack, so that a worker may move up and down by a like amount as the tube rack is moved up and down.

4. The apparatus of claim 1, further including:

an adjustment device connected between said trunnion means and said rocker means for horizontally leveling said rows of holes on said heat exchanger frame tube sheets and baffles.

5. The apparatus of claim 1, further including:

vertically adjustable shim means for supporting said tube sheets of said heat exchanger frame on said support bed so that corresponding levels of rows of holes on said tube sheets may be adjusted to have the same levels as the corresponding rows of holes on said baffles.

6. For inserting tubes in a heat exchanger frame which includes two opposite tube sheets, a plurality of transverse baffles arranged in a series extending longitudinally between the tube sheets, and securement means extending longitudinally between the tube sheets at a plurality of peripheral sites and maintaining longitudinal spacing of said tube sheets and baffles, where the tube sheets and baffles each have a like arrangement of holes formed therethrough comprising a plurality of rows of holes, the rows being at correspondingly different levels, each such hole in a tube sheet and baffle being a member of a respective set of corresponding substantially coaxially aligned holes in others of said tube sheets and baffles, apparatus, comprising:

(a) means for supporting the heat exchanger frame on a foundation so that corresponding rows of holes through each tube sheet and said baffles are substantially horizontal and at the same level;

(b) means for locking the heat exchanger frame relative to said support means and relative to the foundation so that the frame will not be substantially longitudinally displaced as tubes are longitudinally inserted therein through one said tube sheet thereof;

(c) a platform assembly;

(d) said platform assembly includes a substantially horizontal transversally extending rail means;

(e) a motorized tube feeder mounted on said rail means for transverse movement along said rail means, said motorized tube feeder having means defining a nip aimed to face said one tube sheet when said heat exchanger frame is supported on said support means, the motorized tube feeder comprising:

two counterrotatable wheels disposed on parallel shafts with respective radially outer peripheral surfaces of the two wheels being disposed in confronting relation at said nip;

motor means for counterrotating said shafts;

the outer peripheral surfaces of the two wheels being concavely circumferentially grooved for extensively gripping a tube between them;

means for transversally moving at least one of said parallel shafts relative to the other for opening and constricting said nip, so that a tube may be inserted into the nip while the nip is relatively open, whereupon the nip may be closed on the tube for driving the tube into the heat exchanger frame through a respective set of said holes; and (f) means for vertically adjustably moving and disposing said platform assembly so that the nip of said motorized tube feeder may be brought to the level of a row, whereupon said motorized feeder may be moved transversally along said rail means for centering the nip on an individual said set of holes so that a tube may be fed through said motorized feeder into said set of holes.

7. The apparatus of claim 6, further including:
said motorized tube feeder including a bearing housing mounted on said rail means and a main housing suspended on the bearing housing by compression spring means, so that the nip of said motorized tube feeder may move slightly up and down by altering compression of said compression spring means.

8. The apparatus of claim 7, further including:
a piston-operated push rod mounted on said main housing for movement between an out of the way storage position and a position of use in which the piston-operated push rod is longitudinally aligned with the nip and operable for pushing the trailing end of a said tube that has just been inserted in a corresponding set of said holes, clear of said motorized tube feeder.

9. The apparatus of claim 8, further including:
a proximity switch arranged to be tripped by the insertion of a leading end of said tube through said nip and to recover when passed by the trailing end of the same tube as insertion of that tube in the heat exchanger frame nears completion;
the proximity switch being connected in controlling relation to the means for transversally moving at least one of said parallel shafts, so that said nip is drivingly constricted about the pipe in response to tripping of said proximity switch and is opened up in response to recovery of said proximity switch.

10. The apparatus of claim 9, further comprising:
the proximity switch being connected in controlling relation to said piston-operated push rod, so that in response to recovery of said proximity switch, said piston-operated push rod is temporarily moved from its storage position to its use position and the push rod is extended to push the trailing end of the respective tube clear of the motorized tube feeder.

* * * * *